Patented June 17, 1930

1,764,417

UNITED STATES PATENT OFFICE

TEIKICHI SATOW, OF TOKIO, JAPAN

METHOD OF PREPARING COLLOIDAL SILVER

No Drawing. Application filed January 23, 1926. Serial No. 83,201.

This invention relates to an improved method of making colloidal silver for use in the industrial arts, in pharmaceutical preparations, and for other purposes. The purpose of this invention is to prepare a stable and highly concentrated colloidal silver in a simple and inexpensive manner, directly from its nitrate or other available source.

It has heretofore been proposed to prepare colloidal silver by reducing silver nitrate with iron sulfate in the presence of sodium citrate. But this method is expensive and the colloid preparation thus produced contains organic impurities, and is not very stable. On the other hand, the known electrolytic process for producing colloidal silver, while comparatively cheap, is nevertheless unsatisfactory, as the hydrosols of metal thus produced are very dilute, unstable, and, in the case of colloidal silver, of brick-red color.

I have discovered that when a concentrated solution of silver nitrate is treated with colloid carbonhydrates such as dextrin, gum arabic, starch or the like, and to this mixture then is added a small quantity of an alkali, as sodium hydroxid or potassium hydroxid, that the carbohydrate acts, not only as a reducing agent, but it acts also as a colloid carrier, and in the course of two or three hours of standing at room temperature, the reaction takes place, and a colloidal silver solution is thus obtained, which is brownish purple in color, showing that the silver metallic particles are extremely small, and that they exist in a perfect colloidal state.

The silver colloid preparations thus formed are very stable, and keep well in concentrated state. The process is also simple and affords ready means for producing the colloid cheaply. I find the following proportions best suited for practicing my invention: I take a silver nitrate solution of approximately 20% concentration, and to that add a mixed solution of 5% to 10% by weight of carbohydrate, as dextrin, and 1% to 2% of caustic soda. This is well mixed by agitation or otherwise. The mixture is now allowed to remain undisturbed for several hours, or until the reaction is complete, this reaction usually requiring two to three hours at normal temperature. The colloid thus prepared is quite concentrated, and on account of its stability and concentration is well adapted for the industrial arts and in pharmaceutical preparations.

For some purposes, lanolin may be mixed up to 40% with the reaction preparation to good advantage, as the lanolin acts also as a reducing agent and at the same time acts as a colloid protecting agent, producing thereby a very stable colloid.

Having now described my invention, what I claim as new and useful, of my own invention, and desire to secure by Letters Patent is:

1. The method of preparing a silver colloid which comprises taking a silver nitrate solution of approximately 20% concentration and mixing thereto a mixed solution of dextrin and sodium hydroxid with lanolin.

2. That method of preparing a silver colloid which comprises treating a solution of silver nitrate of approximately twenty per cent concentration in the presence of a mixed solution of dextrin and sodium hydroxid and maintaining said preparation in a state of quiet until a colloid of silver is formed.

3. That method of preparing a silver colloid which comprises treating a solution of silver nitrate of from ten to twenty per cent concentration and mixing therewith a reducing carbohydrate, sodium hydroxid and lanolin to the extent of forty per cent.

4. In the method of preparing a silver colloid which comprises treating silver nitrate with a reducing carbohydrate in the presence of an alkali and a substantial amount of lanolin and maintaining said preparation in a state of quiet until a colloid of silver is formed.

5. In the method of preparing a silver colloid, the steps of treating a solution of silver nitrate with a solution of a reducing carbohydrate and sodium hydroxid, in the presence of effective quantities of lanolin.

6. The method of preparing a silver colloid which comprises mixing a solution of silver nitrate with a solution of dextrin and sodium hydroxid in the presence of a sufficient quantity of lanolin.

In testimony whereof I have hereunto set my hand on this 7th day of January A. D., 1926.

TEIKICHI SATOW.